Feb. 17, 1931.  W. C. CARTER  1,792,729
ARM OR LEVER CONNECTING DEVICE FOR SHAFTS
Filed April 29, 1929
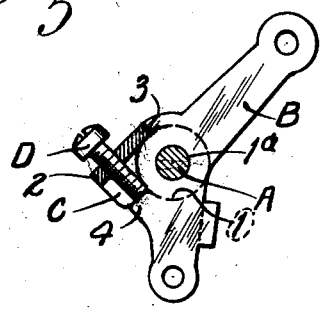
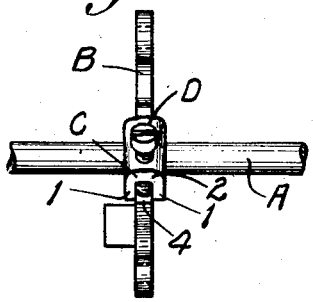
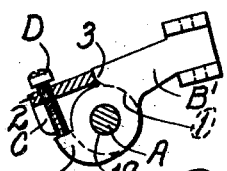
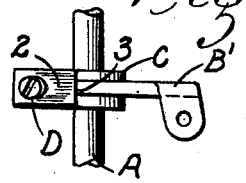
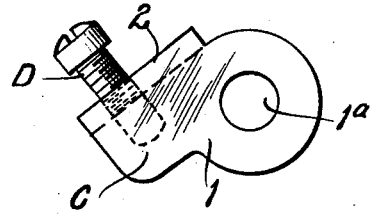
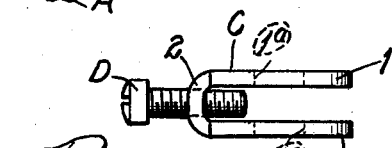
INVENTOR:
WILLIAM C. CARTER
BY Bakewell Church
ATTORNEYS Patented Feb. 17, 1931

1,792,729

UNITED STATES PATENT OFFICE

WILLIAM C. CARTER, OF FLINT, MICHIGAN

ARM OR LEVER CONNECTING DEVICE FOR SHAFTS

Application filed April 29, 1929. Serial No. 359,097.

This invention relates to structures of the kind that comprises a shaft and a lever, arm or other member adjustably mounted on said shaft.

One method that is now used extensively for adjustably mounting a member, such as a lever or arm on a shaft, consists in providing said member with a hole through which the shaft passes and secure said member to the shaft by a set screw adjustably mounted in said member and arranged so that the end of the set screw contacts with the shaft. One serious objection to such a method of mounting a member on a shaft is that the set screw mars, defaces or cuts the shaft and produces a rough surface on the shaft which is apt to interfere with the proper engagement or contact between the shaft and set screw in the event it becomes desirable or necessary to slightly vary the position of said member on the shaft.

The main object of my invention is to provide a means for adjustably mounting a member on a shaft, which is of such construction that it will not mar, cut or deface the shaft.

Another object is to provide an inexpensive means of the character described that is easy to manipulate.

Figure 1 of the drawings is a side elevational view, partly in section, of a structure embodying my invention.

Figure 2 is a front elevational view of said structure.

Figure 3 is an enlarged side elevational view of the saddle of said structure.

Figure 4 is a top plan view of said saddle.

Figure 5 is a view similar to Figure 1, showing how the same saddle may be used for adjustably connecting an arm to the shaft; and Figure 6 is a top plan view of the structure shown in Figure 5.

In the accompanying drawings which illustrate the preferred form of my invention, A designates a shaft, and B in Figures 1 and 2 designates a member, such, for example, as a throttle valve stop lever that is adjustably mounted on said shaft. The member B is provided intermediate its ends with a hole through which the shaft A passes, and said member is clamped to the shaft by means of a device, which I will term a saddle C, that is provided with a set screw or other adjustable device D which is adapted to be manipulated so as to cause the portion of the member B through which the shaft passes to be drawn or forced into tight engagement with the shaft. The saddle C can be constructed in various ways without departing from the spirit of my invention and may consist simply of a member provided with a portion arranged in overlapping relation with the member B and provided with a hole through which the shaft A passes, and also provided with a part that is adapted to co-act with the member B to prevent said member and saddle from moving relatively to each other in one direction when the adjustable device D is manipulated to clamp or bind the member B on the shaft. Preferably, the saddle C is of substantially U shape in general outline and is arranged so that the side legs 1 of same embrace the portion of the member B through which the shaft passes, said side legs 1 having holes 1ª in same for receiving the shaft. The adjustable device D of the structure consists of a set screw that is mounted in the web or cross piece 2 of the saddle, and the saddle is so proportioned that when it is combined with the member B, one edge of the web or cross piece 2 will co-act with a shoulder or abutment 3 on the member B to prevent said member from turning relatively to the saddle C in one direction. The set screw B is mounted in the cross piece 2 of the saddle in such a way that when said set screw is tightened the end of same will contact with or engage a second shoulder or abutment 4 on the member B that is disposed at an angle to the abutment 3, thereby exerting pressure on the member B in a direction to hold the portion 3 of same in tight engagement with the cross piece of the saddle and also exert pressure on the saddle and on the member B in a direction to cause the overlapping portions of said parts through which the shaft A passes to be forced into sufficiently tight engagement with the shaft to securely clamp said parts to the shaft. To state it in another way, the clamping or binding of the member B to the shaft A is effected by tightening the set screw D, so as to exert a thrust on the member B in a direction tending to cause the abutment 3 on said member to rock on the edge of the cross piece 2 of the saddle C, whereupon the portion of the member B through which the shaft passes will be forced tightly against one side of the shaft. Due to the fact that the set screw D is carried by the saddle C, the thrust which said set screw exerts on the abutment 4 of the member B will also tend to force the cross piece of the saddle away from said abutment 4, and thus cause the portion of the saddle through which the shaft passes to be drawn tightly against the shaft at a point substantially opposite the point where the shaft is gripped by the member B.

In such a structure there is no liability of the shaft becoming marred, defaced or cut by the means which clamps or holds the member B on the shaft, due, of course, to the fact that the device D of the structure which is manipulated to effect the clamping of the member B to the shaft does not act on the shaft, but instead, acts on the portion 4 of said member B. Consequently, it is possible to accurately adjust the member B or vary only slightly the position of said member on the shaft A, a thing that is often impossible to do in structures of the type in which the means that is used to hold the adjustable element of the structure consists of a set screw whose end acts directly on the shaft, and thus forms a depression or recess in the shaft which prevents the set screw from contacting with the shaft properly, in the event it is desired to set the adjustable element in a new position which varies only slightly from its former position. In addition to the fact that it eliminates scoring or marring of the shaft, a mounting or holding device of the construction above described is inexpensive to construct and it is easy to adjust or manipulate.

The saddle C is capable of use with various types or kinds of members which it is desired to adjustably connect to a shaft, and in Figures 5 and 6 I have illustrated said saddle as being used for holding a lever B′ whose inner end portion is provided with a hole through which the shaft A passes, said lever being provided with abutments 3 and 4 of the kind previously described, that are adapted to co-act with the edge of the cross piece 2 of the saddle C and with the end of the set screw D of the structure to cause portions of said lever and saddle to be forced tightly against opposite sides of the shaft when said set screw is tightened.

Having thus described my invention, what I claim as new and desire to secure by Letters Patent is:

1. The combination of a shaft, two members mounted on said shaft and provided with overlapping portions through which the shaft passes, angularly-disposed abutments on one of said members, and an adjustable device on the other member adapted to be moved into engagement with one of said abutments to force the other abutment into tight engagement with the member in which said adjustable device is mounted and also exert thrusts on said members transversely of the shaft whereby portions of said members will be clamped tightly against the shaft.

2. The combination of a shaft, a member mounted on said shaft and provided with a hole through which the shaft passes, a substantially U-shaped saddle arranged to embrace said member and provided in its side legs with holes through which the shaft passes, a shoulder on said member that is adapted to engage the cross piece of said saddle, and an adjustable device in said cross piece that is adapted to be manipulated to force said shoulder against said cross piece and exert thrusts on said member and saddle in such a way as to cause portions of same to be clamped tightly against the shaft.

3. The combination of a shaft, a member mounted on said shaft and provided with a hole through which the shaft passes, two angularly-disposed abutments on said member, a substantially U-shaped saddle arranged to embrace said member and provided in its side legs with holes through which the shaft passes, the cross piece of said saddle being adapted to engage one of said abutments, and a set screw in the saddle that is adapted to be forced into engagement with the other abutment.

4. The combination of a shaft, two members oscillatingly mounted on said shaft and provided with overlapping portions through which the shaft passes, co-acting portions on said members for limiting rotative movement of one member relatively to the other in one direction, and an adjustable means on one member that is adapted to be moved into engagement with the other member to hold said co-acting portions in contact with each other and also to exert thrusts on said members transversely of the shaft whereby the portions of said members through which the shaft passes will be clamped tightly against the shaft.

WILLIAM C. CARTER.